US008783100B2

(12) United States Patent
Fels et al.

(10) Patent No.: US 8,783,100 B2
(45) Date of Patent: Jul. 22, 2014

(54) METHOD FOR DYNAMICALLY CHECKING THE TEETH OF A PART AND CHECKING DEVICE USING SAID METHOD

(75) Inventors: Eric Fels, Issenheim (FR); Hubert Schmitt, Zillisheim (FR)

(73) Assignee: Thyssenkrupp System Engineering, Ensisheim (FR)

( * ) Notice: Subject to any disclaimer, the term of this patent is extended or adjusted under 35 U.S.C. 154(b) by 0 days.

(21) Appl. No.: 13/982,322

(22) PCT Filed: Feb. 7, 2012

(86) PCT No.: PCT/FR2012/000048
§ 371 (c)(1),
(2), (4) Date: Jul. 29, 2013

(87) PCT Pub. No.: WO2012/110712
PCT Pub. Date: Aug. 23, 2012

(65) Prior Publication Data
US 2013/0312512 A1    Nov. 28, 2013

(30) Foreign Application Priority Data
Feb. 16, 2011  (FR) ...................................... 11 51254

(51) Int. Cl.
*G01M 13/02* (2006.01)
*G01B 5/20* (2006.01)
(52) U.S. Cl.
CPC ............ *G01M 13/021* (2013.01); *G01B 5/202* (2013.01); *G01M 13/025* (2013.01)
USPC .......................................... 73/162; 33/179.5

(58) Field of Classification Search
USPC .......................................................... 73/162
See application file for complete search history.

(56) References Cited

U.S. PATENT DOCUMENTS

| 2,780,007 | A | 2/1957 | Pomernacki |
| 2,789,087 | A * | 4/1957 | Cines .............................. 203/59 |
| 4,704,799 | A | 11/1987 | Kobetsky |
| 7,775,101 | B2 | 8/2010 | Baruchello |
| 2003/0037626 | A1* | 2/2003 | Bertz et al. ................... 73/865.9 |

(Continued)

OTHER PUBLICATIONS

International Search Report for corresponding PCT/FR2012/000048 mailed on Jun. 26, 2012.

(Continued)

*Primary Examiner* — Lisa Caputo
*Assistant Examiner* — Jamel Williams
(74) *Attorney, Agent, or Firm* — Davis & Bujold, PLLC; Michael J. Bujold

(57) ABSTRACT

A method and device (10) for dynamically checking the teeth of a part (1) including a first motorized spindle (22), supporting the part (1) to be checked, is controlled by a first encoder (25), and a second motorized spindle (32), supporting a master pinion (2), is controlled by a second encoder (35). The two spindles (22, 32) are parallel and separated from one another with the master pinion (2) meshing with the part (1) to be checked. The master pinion (2) has a small thickness, compared to the part (1) to be checked, and the spindle (32) is mounted on a first carriage (43) which is movable in order to move the master pinion (2) along the profile of the teeth of the part (1) to be checked. This method and device allows characterizing both the radial defects and the angular defects of the teeth, and these defects being differentiated.

19 Claims, 2 Drawing Sheets

(56) References Cited

U.S. PATENT DOCUMENTS

2005/0247132 A1* 11/2005 Hamidieh et al. .............. 73/660
2006/0254055 A1* 11/2006 Sabourin ...................... 29/893.1
2008/0028847 A1    2/2008 Baruchello

OTHER PUBLICATIONS

Written Opinion for corresponding PCT/FR2012/00048 mailed on Jun. 26, 2012.

* cited by examiner

METHOD FOR DYNAMICALLY CHECKING THE TEETH OF A PART AND CHECKING DEVICE USING SAID METHOD

This application is a National Stage Completion of PCT/FR2012/000048 filed Feb. 7, 2012 which claims priority from French Application Serial No 11/51254 filed Feb. 16, 2011.

FIELD OF THE INVENTION

The present invention relates to a method for dynamically checking the teeth of a part defined at least by its module, its nominal diameter and its tooth profile, method in which said part to be checked is mounted on a first motorized spindle controlled angularly by a first encoder, a master pinion is mounted on a second motorized spindle controlled angularly by a second encoder, the two spindles being parallel and separated by a center distance that allows the master pinion to mesh with the part to be checked, the angular deviations between the two spindles are measured using the information supplied by the encoders, said information is processed by a calculator and the possible defects of the teeth are deduced from these deviations. It also relates to a checking device that allows implementing said method.

BACKGROUND OF THE INVENTION

Gears are widely used in all sectors of mechanical engineering to transmit movements, from watch making up to the heavy industry, transportation and automotive (gearbox, gear pump, etc.). These gears must have a suitable and constant quality. Therefore, the toothed wheels, the toothed pinions, the toothed shafts or similar must be checked individually after machining on the production lines. In the rest of the text, the general term of "part(s)" shall be used to include all parts that can be used in a gear, a pinion/rack transmission or similar.

The classical solution consists in checking these parts after manufacture either manually or in a metrology department, on coordinate measuring machines. However, this solution is inappropriate today for the following reasons: it is a discontinuous checking process, carried out in static mode, which requires a relatively long checking time and generates a delay that is detrimental on the production line when an intervention is necessary on the cutting machine to correct the detected defects, leading to significant waste that impacts negatively the manufacturing cost of these parts.

It is therefore desirable to use automatic checking machines that are able to check continuously, in dynamic mode, in an accurate, reproducible and fast way the features of the teeth of these parts, directly on the manufacturing line, thus allowing to control almost in real time the cutting machine in order to reduce the waste as much as possible and to optimize the manufacturing costs.

The check implies necessarily the inspection of the various characteristics of the teeth of a part, preferably in operation, that is to say in dynamic mode. The check must allow detecting radial deviations linked with the radial composite deviation F"i (run-out), with the radial jump f"i (teeth jump) and with the center distance, as well as the angular deviations linked with the helix deviation and with the cone inclination deviation. During the check of the teeth, one also tries to check the part for shocks it might have suffered during handling. In operation, these shocks generate vibrations that can be detected, in particular by an acoustic check.

Machines that tend to meet the need for dynamic checking of teeth already exist, but they are not totally satisfactory.

These machines generally include a precision spindle equipped with an expanding arbor that centers, clamps and rotates the part to be checked, and two master pinions used for measurement and located on either side of the part to be checked: a first master pinion that meshes without play with the part to be checked, in contact on both two-flanks, used for checking the radial composite deviations, and a second master pinion mounted on a holder that swivels in the inclination (cone) and deviation (helix) planes, this pinion being stepped so as to provide only two contact areas located at the two ends of the functional width of the teeth to be checked, this second gear being used for checking the helix and cone deviations. An example of a dynamic check of angular deviations using a stepped pinion is described in publication U.S. Pat. No. 7,775,101 and an example of a check of radial deviations is described in publication US 2006/0254055.

Nevertheless, these checking machines are particularly onerous. This is all the more true when several master pinions must be provided so as to check a wide diversity of parts in production. The master pinions must be adapted to every module and every tooth height of the parts.

The swiveling mounting of the stepped gear for checking the helix angle and the cone angle poses a problem of inertia that has to be overcome to remain in contact with the teeth and to follow the helix and cone deviations during the dynamic mode measurement. Therefore the rotational speeds must be reduced, which slows down the checking cycle. Furthermore, the friction at teeth level can distort the measurement.

The approximation of the obtained result that is inherent to the two-flank measurement method with the stepped master pinion is also a major disadvantage. This is a measurement that gives an average value of the inclination deviation of the helices of both tooth flanks and that limits itself to the detection of the two defects, combined or not, of tooth conicity and inclination, hence misinterpretations. Said defects are not individualized and cannot be quantified separately. So, probably good wheels may be scrapped and conversely. Likewise, these approximative results do not allow to act accurately upon the cutting machine to correct the detected defects.

Furthermore, with this measurement method, the consecutive and simultaneous contact of the stepped master pinion and of the part to be checked on several teeth at the same time due to the covering effect of the helical toothing and to the inclination of the generating lines on the flanks does not allow reading other defects due to a faulty positioning of the part on the cutting machine.

In addition, the differentiation between the two flanks of the teeth by reversing the direction of rotation is not guaranteed. Only a check of the composite tangential deviations by meshing on one flank carried out at the level of the nominal diameter of the toothing and then on the other flank would allow a differentiated measurement.

Finally, the master pinions of these checking machines work without play, which does not correspond to the normal operating conditions of the gear. Indeed, the results obtained are not representative of reality.

SUMMARY OF THE INVENTION

The present invention aims to provide a solution for the above-mentioned problems by offering a checking device and a dynamic checking method for teeth that is simple, cost-effective, accurate, reproducible, quick and complete, that allows reducing production costs by using more flexible and more universal solutions than the present solutions, the operating costs of which are reduced in particular by limiting the number of master pinions required and the number of calibrations necessary when changing production to manufacture new parts.

To that purpose, the invention relates to a checking method of the kind stated in the preamble, characterized in that one uses a master pinion with a small thickness compared to the thickness of the part to be checked so as to minimize the contact area of the teeth of said master pinion on the teeth of said part to be checked and in that, to carry out the measuring step, one moves axially said master pinion along the profile of the teeth of said part to be checked and in that one extracts from said performed measurements both the radial defects and the angular defects of the teeth, these defects being differentiated.

One moves preferably the master pinion along the profile of the teeth of the part to be checked between two areas located at the ends of the functional width of the teeth.

Depending on the case, one can use a master pinion with curved teeth so as to tend towards a punctiform contact area with the teeth of said part to be checked.

One chooses preferably the center distance between the two spindles so that the meshing of the master pinion with the part to be checked takes place on their respective nominal diameter, reproducing the normal operation of said gear.

Before carrying out the measuring step itself, one performs a previous step in which one makes the spindles rotate until obtaining the stabilization of the measurements provided by the encoders.

In a first phase of said measuring step, one can make rotate the spindle carrying the master pinion so that it drives the spindle carrying the part to be checked, so that said master pinion is in contact with one of the flanks of the teeth in order to measure the characteristics of this flank and, in a second phase of said measuring step, one can make rotate the spindle carrying the master pinion so that it is driven by the spindle carrying the part to be checked, so that said master pinion is in contact with the other flank of the teeth in order to measure the characteristics of this other flank.

In a preferred embodiment of the process, these two phases of the measuring step are performed without reversing the direction of rotation of said spindles.

In an embodiment variant of said process, these two phases of the measuring step can be performed reversing the direction of rotation of said spindles.

Advantageously, at least one of the spindles carrying the master pinion or the part to be checked can be mounted on a carriage movable in translation perpendicularly to the axis of the spindles in order to adjust their center distance. According to the needs, one can associate to the mobile carriage elastic means arranged to subject the master pinion towards the part to be checked in order to ensure a permanent contact between them.

The spindle carrying the master pinion can also be fitted with acoustic inspection means arranged to detect defects of the teeth due to shocks.

To that purpose, the invention also relates to a checking device of the kind stated in the preamble, characterized in that the master pinion is a pinion with a small thickness compared to the thickness of the part to be checked so as to minimize the contact area of the teeth of said master pinion on the teeth of said part to be checked, in that at least one of said spindle carrying said master pinion or said spindle carrying said part to be checked is mounted on board of a first carriage movable in translation parallel to the axis of said spindles and that is arranged to move said master pinion along the profile of the teeth of said part to be checked, and in that said processing means are arranged to characterize both the radial defects and the angular defects of the teeth, these defects being differentiated.

The master pinion can advantageously have curved teeth so as to tend towards a punctiform contact area with the teeth of the part to be checked.

In a preferred embodiment, the movement control means are arranged so as to make the spindle carrying the master pinion driving or driven with respect to the spindle carrying the part to be checked, in function of the phases of the measuring step.

The movement control means include advantageously a variable speed control so as to make one of the spindles driving or driven with respect to the other, and vice-versa.

As an embodiment variant, they can include a rotation reversal control so as to make one of the spindles driving or driven with respect to the other, and vice-versa.

In a preferred way, at least one of the spindles carrying the master pinion or the part to be checked is mounted on board of a second carriage movable in translation perpendicularly to the axis of the spindles and that is arranged to adjust their center distance.

According to the embodiment variants, the mobile carriage can include elastic means arranged to subject the master pinion towards the part to be checked in order to ensure a permanent contact between them. Likewise, the spindle carrying the master pinion can include acoustic inspection means arranged to detect defects of the teeth due to shocks.

BRIEF DESCRIPTION OF THE DRAWINGS

The present invention and its advantages will be better revealed in the following description of an embodiment given as a non limiting example, in reference to the drawings in appendix, in which.

DETAILED DESCRIPTION OF THE DRAWINGS

Figure 1:
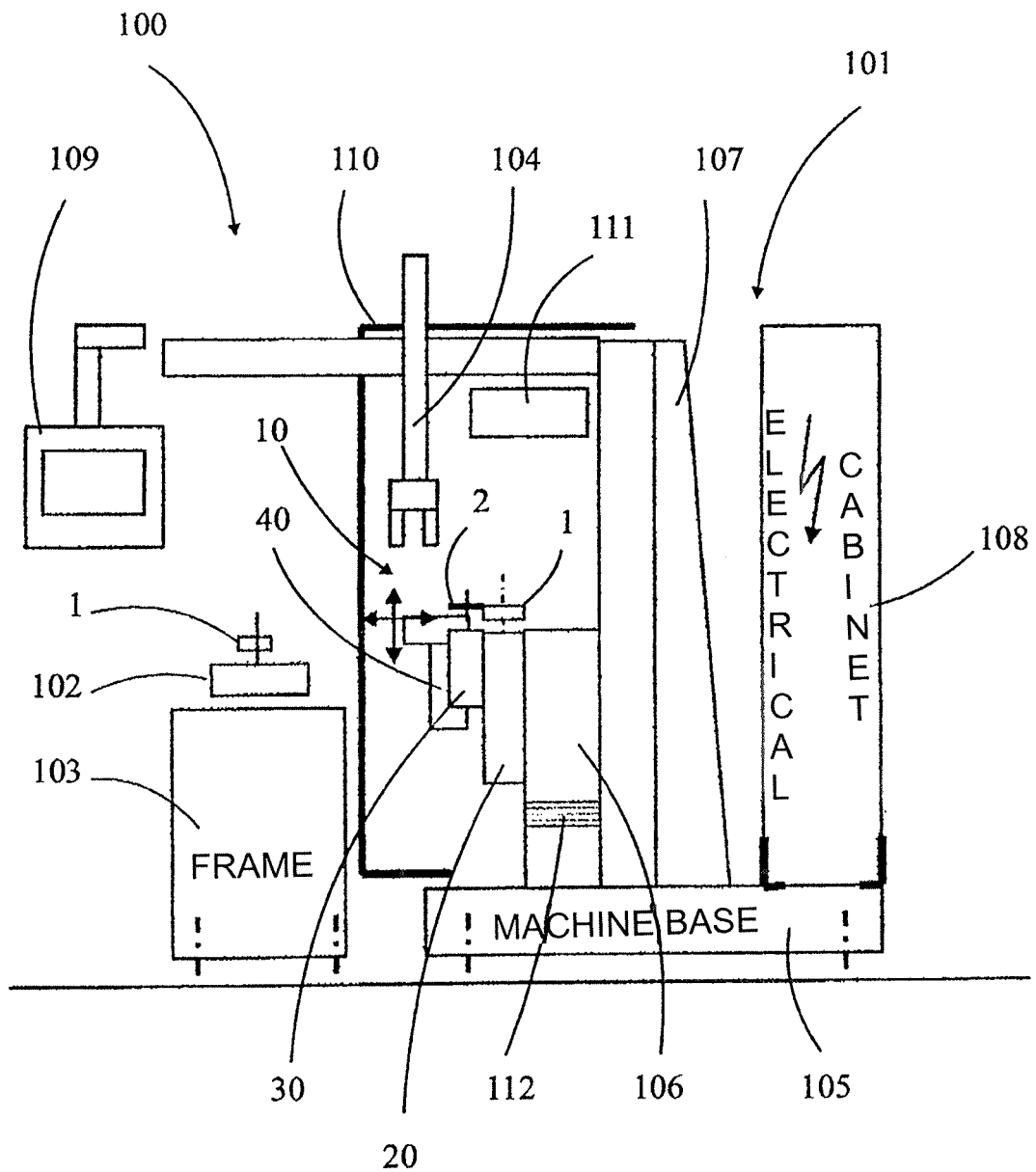
FIG. 1 represents schematically the layout of a checking machine according to the invention, on a toothed parts manufacturing line.

The checking device 10 according to the invention can be a standalone machine or be integrated in a production line 100 of parts 1, as in the layout example represented in FIG. 1, while these parts may be toothed wheels, toothed pinions, toothed shafts or similar. The parts 1 are conveyed to a checking station 101 by a conveyor 102 carried by a frame 103. The checking station 101 includes a parts handler or a robot 104 for loading the parts 1 from the conveyor 102 in the checking device 10. This checking station 101 includes a machine base 105 that carries a frame 106 on which the checking device 10 is mounted. The machine base 105 gathers around a standard frame 107 the basic equipment of a machine other than those related to the checking operation, that is to say an electrical cabinet 108, a man/machine interface panel 109, protective casing 110, a pneumatic unit (not represented) and a lighting 111. The frame 106 dedicated to the checking device 10 is mounted on machine base 105, resting on anti-vibration elements 112.

Figure 2:
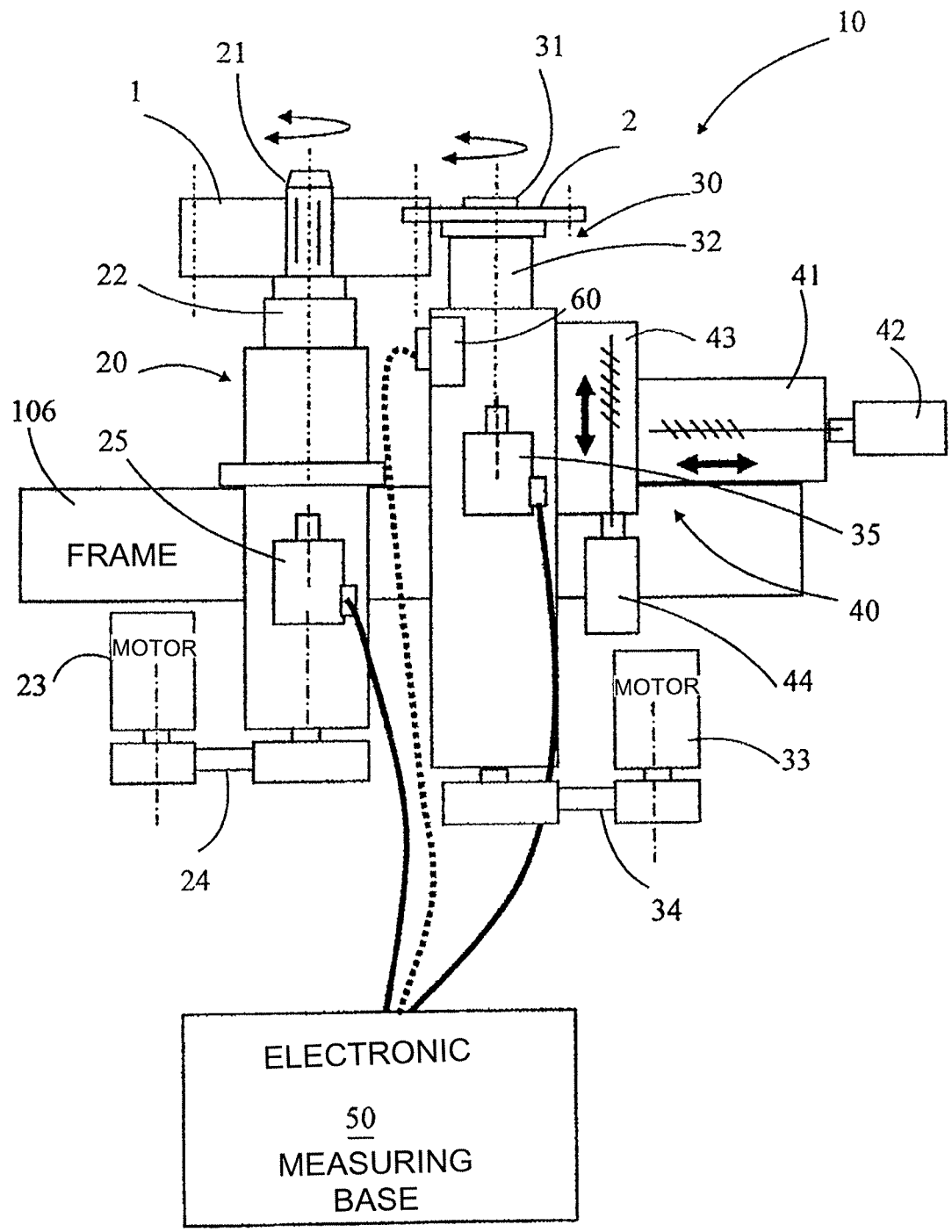
FIG. 2 is a schematic view of the checking machine itself

Referring also to FIG. 2, the checking device 10 according to the invention includes at least:

a first rotation unit 20 equipped with an expanding arbor 21 that holds, clamps and rotates the parts 1 to be checked, a second rotation unit 30 carrying a master pinion 2 used for the measurement, mounted on a numerically-controlled cross carriage 40, and an electronic measuring unit 50.

In the represented example, the rotation units 20, 30 and the cross carriage 40 are carried by frame 106. The rotation unit 20 includes a spindle 22 driven in rotation by a motor 23 and a transmission 24. The spindle 22 includes an expanding arbor 21 that centers and clamps part 1 to be checked. The clamping by expanding arbor 21 ensures the angular connection of the part to be checked on spindle 22. The angle covered by spindle 22 during its rotation is measured by an encoder 25.

The rotation unit 30 includes a spindle 32 driven in rotation by a motor 33 and a transmission 34. The spindle 32 is equipped with an arbor 31 that centers and clamps a master pinion 2. The clamping of the chuck 31 ensures the angular connection of master pinion 2 on spindle 32. The angle covered by spindle 32 during its rotation is measured by an encoder 35. The master pinion 2 used for measurement has a very small thickness with respect to that of part 1 to be checked and is similar to a disk so as to have a small or even punctiform, if the teeth of said master pinion 2 are curved, contact area with part 1 to be checked.

For the quality, reliability and accuracy of the measurements, precision equipment shall be chosen for arbors 21, 31, spindles 22, 32, motors 23, 33 and transmissions 24, 34. The motors 23, 33 can be controlled by means centralized in electrical cabinet 108 or in electronic measuring unit 50.

The encoders 25 and 35 are connected to an electronic measuring unit 50 that recovers the information supplied by these encoders, processes it by analysis and comparison by means of a calculator and provides representative results of the defects of the teeth detected on checked part 1.

The cross carriage 40 comprises, in the represented example, a horizontal carriage 41 driven horizontally by a first actuator 42. This horizontal carriage 41 carries a vertical carriage 43 driven in translation vertically by a second actuator 44. This vertical carriage 43 carries the second rotation unit 30 on which master pinion 2 is mounted. This embodiment is of course non-limiting. In another embodiment (not represented), the cross carriage can be replaced with two distinct carriages, one vertical and carrying the first rotation unit 20 and the other horizontal and carrying the second rotation unit 30 or vice-versa. Any other configuration that will allow moving rotation units 20 and 30 with respect to each other in order to, on the one hand, adjust the center distance between the two spindles 22 and 32 and, on the other hand, move the master pinion 2 along the teeth of part 1 to be checked to carry out the measurement, can be considered. In a non represented variant, the horizontal carriage 41 can cooperate with elastic means arranged to subject master pinion 2 towards part 1 to be checked and thus ensure a permanent contact between them. This configuration is necessary if the measurement is to be carried out on the root of the teeth of part 1 to be checked instead of on its nominal diameter.

The actuators 42 and 44 can be made of motors driving worms that engage a nut integral with the carriages, while these carriages can be guided on tracks. Of course, any other equivalent embodiment can be considered. These actuators 42, 44 can be controlled by means centralized in electrical cabinet 108 or in electronic measuring unit 50.

The spindle 32 of the second rotation unit 30 can be equipped with an acceleration meter 60 to measure the radial acceleration generated by the rotation of the gear made of part 1 to be checked and master pinion 2, in order to perform an acoustic check. This option allows detecting on part 1 to be checked the possible defects due to shocks. The acceleration meter 60 is connected to the measuring electronics 50.

The operating mode of checking device 10 is described hereafter. The dynamic check process according to the invention consists in meshing part 1 to be checked with a measurement master pinion 2 and thus put this part 1 to be checked in normal operating conditions in a gear. In this configuration, part 1 to be checked and master pinion 2 mesh on their nominal diameter.

Part 1 to be checked is centered and clamped on expanding arbor 21 at the end of spindle 22. Master pinion 2 is also centered and clamped on arbor 31 at the end of spindle 32. The cross carriage 40 allows on the one hand adjusting the center distance of the gear corresponding to normal operation, in which meshing takes place on the nominal diameter of the toothed wheels and, on the other hand, positioning master pinion 2 along the teeth of part 1 to be checked at least in two areas located at the ends of the functional width of the teeth.

The cross carriage 40 serves for generating a relative movement between the two spindles 22 and 32 in two directions: a movement parallel to the axis of spindles 22 and 32 to move master pinion 2 on whole or on a section of the teeth of part 1 to be checked between its two ends, and a movement perpendicular to the axis of spindles 22 and 32 for adjusting the center distance of the gear.

When master pinion 2 is in engaged position at the operating center distance of the gear, that is to say on the nominal diameter of part 1 to be checked and at one of the ends of the teeth, the gear is rotated according to the driving/driven principle, that is to say with a rotational speed of master pinion 2 slightly higher or lower than that of part 1 to be checked, in order to make either spindle 32 carrying master pinion 2 or spindle 22 carrying part 1 to be checked the driving or the driven spindle, without reversing the direction of rotation. The goal is to ensure a one-flank contact with a control of the torque in order to limit the contact force, namely a contact on only one of the flanks of the teeth, then on the other flank. The angles covered respectively by part 1 to be checked and by master pinion 2 are recorded on at least one revolution. The measurement is carried out dynamically in two phases, on one of the flanks of the teeth, at different heights, and at least at the two ends of the functional width of the teeth, and then on the other flank of the teeth, by modifying the rotational speed of master pinion 2 with a control of the torque in order to limit the contact force. The measurement can be performed at points located all along the profile of the teeth, or at least at the two points located at the two ends of the functional width of the teeth.

Before carrying out the measurement itself, the gear can be rotated for a period of time necessary for stabilizing the measurements supplied by encoders 25 and 35. This previous stabilization phase allows avoiding aberrations during measurement.

In a variant of the checking method, the same results can be achieved by reversing the direction of rotation and using the driving/driven principle for master pinion 2 with respect of part 1 to be checked. However, this solution is less favorable, since it lengthens the checking time.

The radial composite deviations, as well as the helix and cone deviations, are then determined by calculation with suitable software, based on the angular values supplied by encoders 25 and 35, and recorded by electronic measurement unit 50 on whole or a part of the width of the teeth. The processing and the calculations are carried out while the gear rotates, in real time. These results are then transmitted to the parts manufacturing line in order to correct the defects found.

This inspection method has several advantages:
it allows the individual check of the radial composite deviations and of the helix and cone deviations, it allows adding the shock check,
it allows a dynamic single-flank measurement that ensures reliable results,

The invention claimed is:

1. A method for dynamically checking teeth of a part (1) defined at least by its module, its nominal diameter and its tooth profile, the method comprising the steps of:
- mounting the part (1) to be checked on a first motorized spindle (22) angularly controlled by a first encoder (25),
- mounting a master pinion (2) on a second motorized spindle (32) angularly controlled by a second encoder (35),
- arranging the two spindles parallel to one another and separating the two spindles by a center distance that allows the master pinion to mesh with the part to be checked,
- measuring angular deviations between the two spindles using the information supplied by the encoders, processing the information by a calculator and deducing possible defects of the teeth from these deviations,
- employing a master pinion (2) with a small thickness compared to the thickness of the part (1) to be checked so as to minimize the contact area of the teeth of the master pinion on the teeth of the part to be checked,
- when carrying out the measuring step, axially moving the master pinion (2) along a profile of the teeth of the part (1) to be checked, and
- extracting from the performed measurements both radial defects and angular defects of the teeth, and these defects being differentiated.

2. The method for checking according to claim 1, further comprising the step of one moves the master pinion (2) along the profile of the teeth of the part (1) to be checked between two areas located at the ends of a functional width of the teeth.

3. The method for checking according to claim 1, further comprising the step of using a master pinion (2) with curved teeth so as to tend towards a punctiform contact area with the teeth of the part (1) to be checked.

4. The method for checking according to claim 1, further comprising the step of selecting the center distance between the two spindles (22, 32) so that the meshing of the master pinion (2) with the part (1) to be checked occurs on respective nominal diameters thereof thereby reproducing the normal operation of the gear.

5. The method for checking according to claim 1, further comprising the step of, before carrying out the measuring step, performing a step of rotating the spindles (22, 32) until obtaining a stabilization of the measurements provided by the encoders (25, 35).

6. The method for checking according to claim 1, further comprising the step of, during a first phase of the measuring step, rotating the spindle (32) carrying the master pinion (2) so that it drives the spindle (22) carrying the part (1) to be checked, or conversely, so that the master pinion (2) is in contact with one of the flanks of the teeth in order to measure the characteristics of this flank and, during a second phase of the measuring step, rotating the spindle (32) carrying the master pinion (2) so that it is driven by the spindle (22) carrying the part (1) to be checked, or conversely, so that the master pinion (2) is in contact with the other flank of the teeth in order to measure the characteristics of this other flank.

7. The method for checking according to claim 6, further comprising the step of performing the two phases of the measuring step without reversing a direction of rotation of the spindles.

8. The method for checking according to claim 6, further comprising the step of preforming the two phases of the measuring step by reversing the direction of rotation of the spindles.

9. The method for checking according to claim 1, further comprising the step of mounting at least one of the spindles (22, 32), carrying the master pinion (2) or the part (1) to be checked, on a carriage (41) movable perpendicularly in translation to the axis of the spindles (22, 32) in order to adjust the center distance.

10. The method for checking according to claim 9, further comprising the step of associating with to the mobile carriage (41) elastic means arranged to bias the master pinion (2) towards the part (1) to be checked in order to ensure a permanent contact between them.

11. The method for checking according to claim 1, further comprising the step of fitting the spindle (32) carrying the master pinion (2) with acoustic inspection means (60) arranged to detect defects of the teeth due to shocks.

12. A device (10) for dynamically checking teeth of a part (1) defined at least by its module, its nominal diameter and its tooth profile, the device comprising:
- a first spindle (22), on which the part (1) to be checked is mounted, being coupled with a motorization (23, 24) and angularly controlled by a first encoder (25),
- a second spindle (32), on which a master pinion (2) is mounted, being coupled with a motorization (33, 34) and angularly controlled by a second encoder (35),
- the two spindles (22, 32) being parallel and separated by a center distance that allows the master pinion (2) to mesh with the part (1) to be checked,
- movement control means for controlling the movement, and
- means for processing the information provided by the encoders arranged to characterize possible defects of the teeth,
- wherein the master pinion (2) is a pinion with a small thickness compared to the thickness of the part (1) to be checked so as to minimize a contact area of the teeth of the master pinion on the teeth of the part to be checked,
- at least one of the spindle (32) carrying the master pinion (2) or the spindle (22) carrying the part (1) to be checked is mounted on board of a first carriage (43) movable in translation parallel to the axis of the spindles (22, 32) and is arranged to move the master pinion (2) along the profile of the teeth of the part (1) to be checked, and
- the processing means are arranged to characterize both the radial defects and the angular defects of the teeth, and these defects being differentiated.

13. The device for checking according to claim 12, wherein the master pinion (2) comprises curved teeth so as to tend towards a punctiform contact area with the teeth of the part (1) to be checked.

14. The device for checking according to claim 12, wherein the movement control means are arranged so as to make the spindle (32) carrying the master pinion (2) driving or driven with respect to the spindle (22) carrying the part (1) to be checked, in function of the phases of measuring step.

15. The device for checking according to claim 14, wherein the movement control means include a variable speed control so as to make one of the spindles driving or driven with respect to the other, and vice-versa.

16. The device for checking according to claim 14, wherein the movement control means include a rotation reversal control so as to make one of the spindles driving or driven with respect to the other, and vice-versa.

17. The device for checking according to any of claim 12, wherein at least one of the spindles (22, 32) carrying the master pinion (2) or the part (1) to be checked is mounted on a second carriage (41) movable perpendicularly in translation to the axis of the spindles (22, 32) in order to adjust their center distance.

18. The device for checking according to claim 17, wherein the second carriage (41) comprises elastic means arranged to bias the master pinion (2) towards the part (1) to be checked in order to ensure a permanent contact therebetween.

19. The device for checking according to claim 12, wherein the spindle (32) carrying the master pinion (2) comprises acoustic inspection means (60) arranged to detect defects of the teeth due to shocks.

\* \* \* \* \*